(12) United States Patent
Kazmi et al.

(10) Patent No.: US 8,346,257 B2
(45) Date of Patent: Jan. 1, 2013

(54) SELECTING A CELL ASSOCIATED WITH A RADIO ACCESS TECHNOLOGY

(75) Inventors: Muhammad Kazmi, Bromma (SE); Gabor Fodor, Hasselby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 208 days.

(21) Appl. No.: 12/679,407

(22) PCT Filed: Mar. 20, 2008

(86) PCT No.: PCT/SE2008/050318
§ 371 (c)(1),
(2), (4) Date: Mar. 22, 2010

(87) PCT Pub. No.: WO2009/041878
PCT Pub. Date: Apr. 2, 2009

(65) Prior Publication Data
US 2010/0216468 A1    Aug. 26, 2010

(30) Foreign Application Priority Data

Sep. 26, 2007   (SE) .................................... 0702160

(51) Int. Cl.
*H04W 36/00* (2009.01)
(52) U.S. Cl. ............... 455/435.3; 455/435.2; 455/435.1; 455/436; 455/428; 455/558
(58) Field of Classification Search .................. 455/558, 455/407, 408, 439, 432.1, 434, 435.3, 435.2, 455/435.1, 436, 428; 370/401, 338
See application file for complete search history.

(56) References Cited

U.S. PATENT DOCUMENTS

| 6,334,052 B1 | 12/2001 | Nordstrand |
| 7,072,651 B2 * | 7/2006 | Jiang et al. ................. 455/432.1 |
| 2004/0058679 A1 * | 3/2004 | Dillinger et al. .............. 455/439 |
| 2004/0224689 A1 | 11/2004 | Raghuram et al. |

(Continued)

FOREIGN PATENT DOCUMENTS

WO    01/26409 A1    4/2001

OTHER PUBLICATIONS

3RD Generation Partnership Project. "E-UTRA Cell Selection and Cell Reselection Aspects." 3GPP TSG RAN WG4 Meeting #44, R4-071396, Athens, Greece, Aug. 20-24, 2007.
3RD Generation Partnership Project. "Mobility Uses Cases Based on the Access Pipe Concept." 3GPP TSG RAN WG2 Meeting #57bis, R2-071258, St. Julian's, Malta, 26030 Mar. 2007.

*Primary Examiner* — David Q Nguyen
(74) *Attorney, Agent, or Firm* — Coats & Bennett, P.L.L.C.

(57) ABSTRACT

Method in a user equipment for selecting a cell associated with a radio access technology. The method comprises the steps of obtaining an instruction to select a cell to be used among cells using a radio access technology being associated with a specific service class. Also comprising receiving a broadcast, which broadcast uses a radio access technology being associated with a respective service class and being associated with a respective priority level within that service class. Also comprising selecting a cell, which cell is using a radio access technology being associated with the specific service class in accordance with the obtained instruction and which cell is associated with the highest priority level. An arrangement in a user equipment, a method in a base station, an arrangement in a base station, a method in a core network node and an arrangement in a core network node is also provided.

7 Claims, 12 Drawing Sheets

U.S. PATENT DOCUMENTS

2006/0114871 A1* 6/2006 Buckley et al. ............... 370/338
2007/0195803 A1* 8/2007 Lowery et al. ................ 370/401
2007/0202875 A1* 8/2007 Dorsey et al. ................ 455/434
2008/0039082 A1 2/2008 Kim
2008/0139204 A1 6/2008 Hsieh et al.

* cited by examiner

Access Pipe A: LTE f4; 3G f3; 3G f2; 3G f1
Access Pipe B: 3G f3; LTE f5;

sending by 140:

| cell | A | B | C |
|------|-----|-----|-----|
| 440 | A.2 | B.1 | C.4 |
| 442 | yes | yes | no |
| 444 | yes | no | yes | sending by 142:

| cell | A | B | C |
|------|-----|-----|-----|
| 442 | A.1 | B.5 | - |
| 440 | yes | yes | yes |
| 444 | yes | no | yes |

Fig. 4b

SELECTING A CELL ASSOCIATED WITH A RADIO ACCESS TECHNOLOGY

TECHNICAL FIELD

The present invention relates to a method and an arrangement in a user equipment, a method and an arrangement in a base station, and a method and an arrangement in a core network node. More particularly the present invention relates to a mechanism for selecting a cell associated with a radio access technology.

BACKGROUND

Currently, standardized and commercially deployed radio access technologies are proliferated. Such radio access technologies include the Global System for Mobile communications (GSM), Enhanced Data Rates for GSM Evolution (EDGE), General Packet Radio System (GPRS), wide-band code division multiple access (WCDMA), Long Term Evolution (LTE) systems, wireless local area networks (WLAN), CDMA 2000 and others.

From an end-user perspective, most of the user equipments, such as cellular phones, Personal Digital Assistants (PDA), laptop and stationary computers support multiple wireless access technologies allowing for accessing services via the "best" currently available radio access technology. Indeed, by now the notion of the "always best connected" (ABC) networks is routinely supported by wireless service operators and widely used by end-users.

Particular aspects of multi radio access technology systems in general and ABC networks in particular are access discovery and access selection. Access discovery generally assumes that as the user equipment moves along in the coverage area, it performs periodic measurements on multiple radio access technologies and frequencies for the purpose of detecting and evaluating the availability and quality of available wireless networks. For instance, a GSM/WCDMA capable mobile phone may be configured such that when it camps on GSM, it periodically scans or measures its radio environment for WCDMA cells.

Such periodic measurements, which in reality occur continuously, however, require that the user equipment operates its radio receiver de facto continuously leading to an increased battery consumption compared to the case when the user equipment keeps camping on the current radio access technology as long as there is no compelling reason to perform access discovery and selection. Such reason may be the activation of a particular service, running out of coverage of the current radio access technology, a radio link failure or other events. Also, the issue of battery consumption associated with access discovery is widely recognized.

According to one solution, the available radio access technologies of the multi-access system are associated with a priority value. In this priority scheme, user equipments do not measure on alternative radio access technologies that are of lower priority than the current one. For instance, when the user equipment camps on its highest priority radio access technology, it does not perform radio access technology detection as long as the quality of the current radio access technology is acceptable. The priority based mechanism is a scheme to minimize the inter-frequency and inter-radio access technology measurements and at same time to allow user equipments to have a preference to camp on their prioritized radio access technologies and frequencies.

A problem with continuous measurement of inter-frequency and inter-radio access technology detection/selection is the increased user equipment battery consumption. Some solutions to this problem may be to not measure for alternative radio access technologies continuously but only when some predefined conditions are met.

Some of these mechanisms apply radio access technology and/or frequency specific minimum threshold and offset values that govern when the user equipment should start measurements and should make a frequency/radio access technology selection decision. For instance. it is possible to set these values such that the user equipment never measures on GSM while camping on WCDMA. Alternatively, the user equipment can trigger measurements only when the WCDMA signal strength and signal quality drops below some threshold value.

Another category is the priority based mechanism as discussed in the previous subsection. According to such solutions, each access is assigned a certain priority value. The priority value of the current radio access technology is an important input to the user equipment measurement triggering mechanism, as discussed above.

In a more elaborate version of the priority based mechanism multiple priority lists of frequencies and radio access technologies are created. Each of these lists, consisting of an ordered list of carrier frequencies and radio access technologies, are referred to as an access pipe. Thus an access pipe is an ordered, prioritized list of radio access technologies and carrier frequencies, which radio access technologies and/or carrier frequencies may be selected by a user equipment. Within a particular access pipe, each of the radio access technologies that constitute that access pipe is associated with a distinct priority level. This distinct priority level which a given radio access technology, within an access pipe, is associated with is referred to as the class of the radio access technology.

An access pipe is associated with a class. For example, an access pipe may be of broadband, medium speed or narrow band class, which would generally be associated with user's subscription. Within an access pipe different frequencies and radio access technologies may have different priority level. For instance within access pipe A, belonging e.g. to the broadband class. LTE frequency f4, e.g. 10 MHz, may have higher priority than 3G frequency f1. These frequencies or radio access technologies within an access pipe is referred to as access pipe entities or ingredients.

The access pipe concept involves three key aspects. Firstly, some entity that has information of the overall available radio access technologies within a certain geographical area needs to construct the access pipes. For instance, the Operator may want to define three access classes such as e.g. broadband, medium speed and narrow band, each of which is associated with an access pipe. Each access pipe is an enumerated list of available accesses.

Secondly, each user equipment must learn to which access class it belongs. For this purpose various signalling and broadcasts solutions are available.

Thirdly, once the user equipment knows which access pipe it belongs to, it needs to find the list members, e.g. cells or sites belonging to the ingredients of that particular access pipe. For instance, if a user equipment belongs to access pipe "B", and access pipe "B" comprises 3G_f3 and E-UTRAN_f5, it needs to search for 3G_f3 and, possibly, for E-UTRAN_f5.

The existing solution makes the subtle assumption for the second step above, that the user equipment is assigned the explicit list that constitutes the access pipe. This solution however has the following disadvantages and problems:

The signalling message to the user equipment is rather long and dependent of the length of the access pipe, in terms of the number of radio access technologies.

Specifically for 3GPP accesses, for user equipments in idle mode, there is no cell specific signalling available. Therefore, it is not possible to define site or location specific access pipes within a certain geographical area. For LTE, new access pipes can be signalled to the user equipment upon tracking area updates, since at those occasions non-access stratum (NAS) signalling takes place between the user equipment and the core network.

NAS is a functional layer e.g. in the UMTS protocol stack between the Core Network and user equipment. The layer supports signalling and traffic between those two elements.

It is not possible to change the definition of a particular access pipe between NAS signalling instances. For certain user equipments, this may mean that modifying the access pipe, e.g. by changing the priorities or adding and/or deleting a particular radio access technology to or from the list is not possible for a period of hours, or even days.

Further, the previously known solutions do not address a scenario in which different base station sites within a coverage area, or more specifically: within tracking area, have different capabilities leading to a situation where all possible access pipes may not be supported in all the sites.

Yet a discussed solution is to provide the details of the access pipe, to which the user equipment is assigned, to each user according to its subscription, e.g. cells with their priority belonging to access pipe A, at the time of tracking area update via NAS signalling. There are at least two problems with this later solution. Firstly this is quite detailed information depending upon the number of cells, and/or ingredients, of the access pipe. This means if provided to each user individually then the aggregate signalling load becomes quite large. Another major problem arises in homogeneous tracking areas in terms of availability of access pipes, e.g. sites have different access pipes or some sites have fewer pipes compared to others. For instance the behaviour of a user equipment associated with access pipe A would remain unspecified when it moves to a site that does not support access pipe A. The user equipment could either camp on any cell, which means that the access pipe concept would fail in this scenario. Another possibility would be that NAS signalling provide full details, i.e. super set, of all the access pipes in the entire tracking area with some default or fall back pipes. However, this would lead to large signalling overheads given the fact that this information is to be provided to each user in the entire tracking area.

SUMMARY

It is therefore an object of the present invention to provide a mechanism in a wireless communication system that decreases the transmission power consumption when selecting a cell.

According to a first aspect, the object is achieved by a method in a user equipment for selecting a cell associated with a radio access technology. The method comprises the step of obtaining an instruction to select a cell to be used among cells using a radio access technology being associated with a specific service class. The method comprises the further step of receiving from at least one cell, a message, which respective message is sent with a radio access technology being associated with a respective service class and being associated with a respective priority level within that service class. The message further comprises a reference to that service class and that priority level. Also, the method comprises the step of selecting a cell among the at least one cells, which cell is using a radio access technology being associated with the specific service class in accordance with the obtained instruction and which cell is associated with the highest priority level within that service class.

According to a second aspect, the object is also achieved by an arrangement in a user equipment, for selecting a cell associated with a radio access technology. The arrangement comprises an obtaining unit. The obtaining unit is adapted to obtain an instruction to select a cell to be used among cells using a radio access technology being associated with a specific service class. The arrangement also comprises a receiving unit. The receiving unit is adapted to receive a message from at least one cell, the message is sent with a radio access technology being associated with a service class and being associated with a priority level. Further, the arrangement comprises a selecting unit. The selecting unit is adapted to select a cell among the at least one cells, which cell is using a radio access technology being associated with the specific service class in accordance with the obtained instruction and which cell is associated with the highest priority level.

According to a third aspect, the object is further achieved by a method in a base station serving a cell, for assisting a user equipment to select a cell associated with a radio access technology. The base station is using a radio access technology comprised within a service class at a certain priority level. The method comprising the step of sending a message comprising one reference to the service class and the priority level associated with the radio access technology used by the cell.

According to a fourth aspect, the object is achieved by an arrangement in a base station serving a cell, for assisting a user equipment to select a cell associated with a radio access technology. The base station is adapted to offer a radio access technology comprised within a service class at a certain priority level. The arrangement comprises a signalling unit. The signalling unit is adapted to send a reference to the service class and the priority level associated with the radio access technology used by the base station.

According to a fifth aspect, the object is achieved by a method in a core network node for configuring service classes in a network. The method comprises the step of associating a radio access technology with a specific service class and a specific priority level. Also, the method comprises the step of sending to a base station. a message comprising a reference to the service class and the priority level associated with the radio access technology used by the base station.

According to a sixth aspect, the object is also achieved by an arrangement in a core network node for configuring service classes in a network. The arrangement comprises an association unit, adapted to associate a radio access technology with a specific service class and a specific priority level. The arrangement also comprises a signalling unit. The signalling unit is adapted to send, to a base station. a message comprising a reference to the service class and the priority level associated with the radio access technology used by the base station.

Since the user equipment receives only a reference to an access pipe, rather than the complete access pipe power resources are saved.

Another advantage of the present methods and arrangements is that a change in membership and structure of the access pipe does not need to be signalled to the user equipment. The user equipment only knows that it belongs to a certain access pipe, or service level, but it does not know what its contents i.e. the 'ingredient list' is. Thus a manipulation of the access pipe can happen dynamically, becoming effective virtually immediately or with low delay, without involving updating an access pipe at the user equipment.

Yet an advantage of the present methods and arrangements is that upgrading the system with new radio access technologies and reconfiguring the access pipes become transparent for the end users. Thus the user equipments do not need to receive signalled explicit lists of the reconfigured access pipes. Each particular user equipment will continue to belong to the same access pipe, say, Access Pipe A, independently of the content of the access pipe.

A further advantage of the present methods and arrangements is that the behaviour of the user equipment is well specified in network deployment scenario, which does not fully correspond to user equipment access pipe subscription level.

BRIEF DESCRIPTION OF THE DRAWINGS

The present invention will now be described more in detail in relation to the enclosed drawings, in which:

FIG. 4b is a block diagram depicting broadcasted access pipe references according to some embodiments.

DETAILED DESCRIPTION

The invention is defined as a method and an arrangement in a user equipment, a method and an arrangement in a base station, and a method and an arrangement in a core network node, which may be put into practice in the embodiments described below. This invention may, however, be embodied in many different forms and should not be construed as limited to the embodiments set forth herein; rather, these embodiments are provided so that this disclosure will be thorough and complete, and will fully convey the scope of the invention to those skilled in the art. It should be understood that there is no intent to limit the present method and arrangement in a user equipment, method and arrangement in a base station, and method and arrangement in a core network node to any of the particular forms disclosed, but on the contrary, the present method and arrangement in a user equipment, method and arrangement in a base station, and method and arrangement in a core network node is to cover all modifications, equivalents, and alternatives falling within the scope of the invention as defined by the claims.

Still other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

Figure 1A:
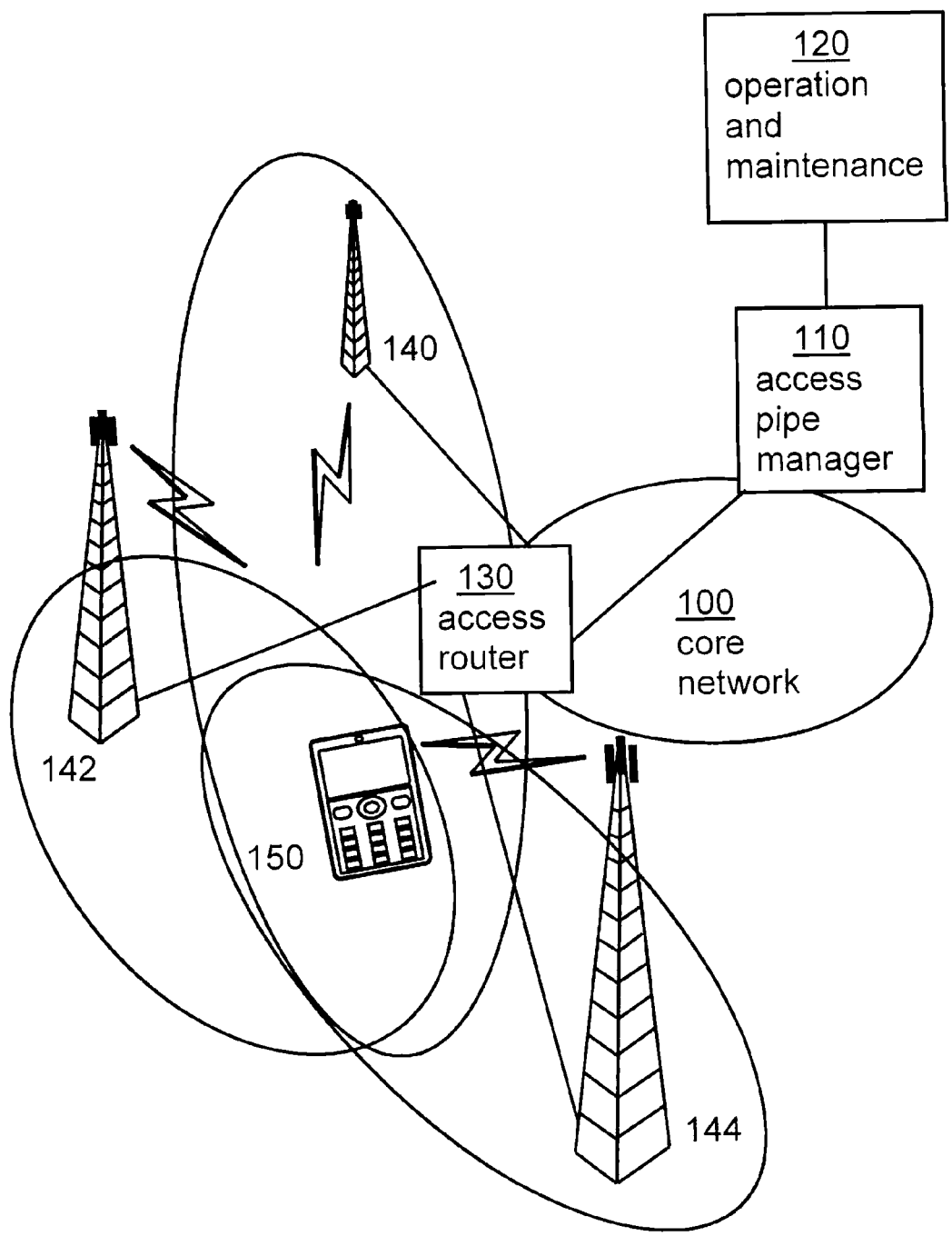
FIG. 1a is a schematic block diagram illustrating a wireless communication system according to some embodiments.

FIG. 1a depicts a core network 100 comprising an access pipe concept.

An access pipe is an ordered, prioritised list of radio access technologies and carrier frequencies, wherein each available radio access technologies and/or carrier frequency is assigned a unique priority level value. The access pipe is corresponding to a service class. Different access pipes may be associated with different service classes, such that e.g. an access pipe A may correspond to a broadband service class, an access pipe B may correspond to a medium speed service class and an access pipe C may correspond to a narrow band service class, just to briefly mention one possible, non-limiting example of service class grouping.

Further, each radio access technology may be associated with several service classes and thus be comprised within several access pipes but, possibly, at a different priority level.

Figure 1B:
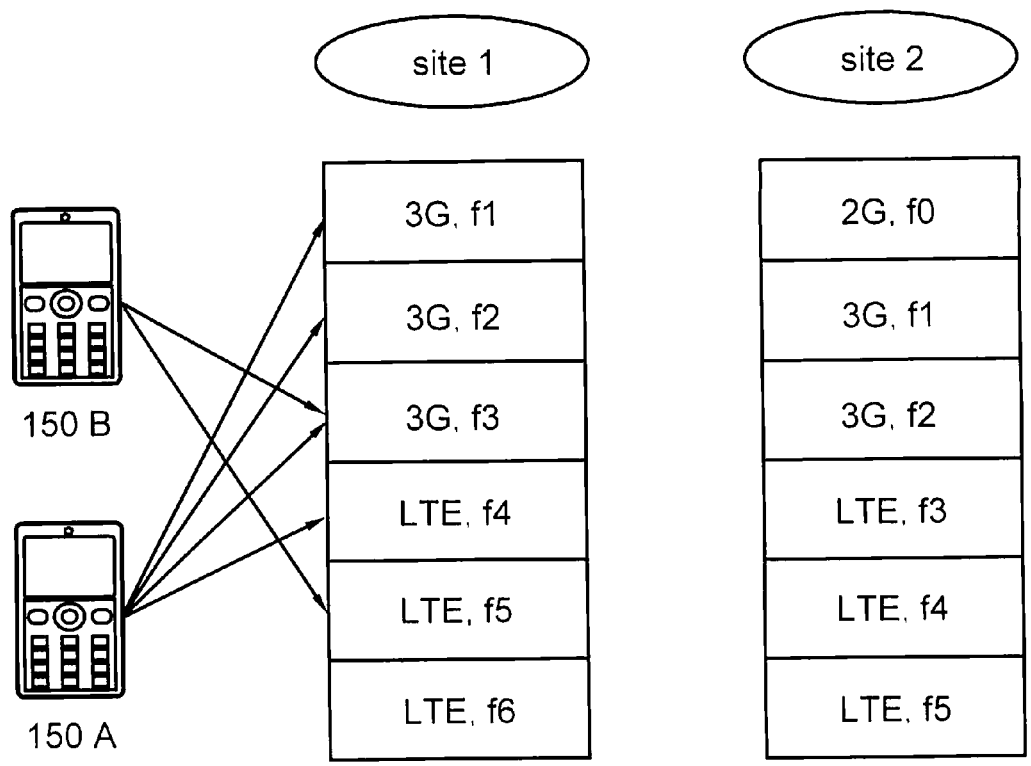
FIG. 1b is a schematic block diagram illustrating access pipes within a wireless communication system according to some embodiments.

FIG. 1b is a schematic block diagram illustrating the access pipe concept within a wireless communication system according to some embodiments. Different sites, e.g. site 1 and site 2 may comprise different radio access technologies. Two access pipes A, B are defined in this example. Each of the user equipments 150A and 150B is associated with exactly one access pipe at any one time. The access pipe is an ordered list of carrier frequencies and radio access technologies, the access pipe entities or ingredients. Thus the user equipment 150A only camp on cells comprised within access pipe A and the user equipment 150B only camp on cells comprised within access pipe B.

As illustrated in FIG. 1 a the core network 100 comprises an access pipe manager 110. The access pipe manager 110 is a logical node which constructs the access pipes that are valid within the geographical area of an access router 130. The access pipe manager 110 is adapted to have access to the operation and maintenance system 120 as well as to the access router 130. The access router 130 is adapted to be connected to multiple base stations 140, 142, 144. A plurality of base stations may be located at the same site, e.g. with antenna means mounted on the same physical structural element such as e.g. radio tower.

Each of the base station 140, 142, 144 may also be referred to as e.g. an access point, a Node B, an eNode B and/or a base transceiver station, Access Point Base Station, base station router, etc depending e.g. of the radio access technology used. However, in order to not unnecessarily complicate the understanding of the present methods and arrangements, the expression "base station" will be used consistently in this text for describing the base station 140, 142, 144.

A user equipment 150, such as e.g. a wireless communication terminal, a mobile cellular telephone, a Personal Digital Assistant (PDA), a laptop, a computer or any other kind of device capable of managing radio resources may communicate wirelessly with any of the base stations 140, 142, 144 within range. The radio access technologies used for wireless communication may comprise technologies such as e.g. Code division multiple access (CDMA), Wideband Code Division Multiple Access (WCDMA), CDMA 2000, High Speed Downlink Packet Data Access (HSDPA), High Data Rate (HDR) etc, just to mention a few examples.

As used herein, wireless communication network may refer to various radio access technologies in the traditional sense, a wireless local area network (LAN) or a wireless personal area network without departing from the teachings of the present invention. These networks may include, for example, radio access technologies, such as Enhanced Data rates for GSM Evolution (EDGE), General Packet Radio Service (GPRS), Global System for Mobile Telecommunications (GSM), High Speed Packet Data Access (HSPA), Universal Mobile Telecommunications System (UMTS) and/or Wireless Local Area Networks (WLAN), such as Wireless Fidelity (WiFi) and Worldwide Interoperability for Microwave Access (WiMAX), Bluetooth or according to any other wireless communication standard.

The operation and maintenance system 120 provides an interface toward a human network operator. The network operator may configure access pipes manually or by using some intelligent, automated mechanism in the access pipe manager 110. Different access pipes may be configured for different geographical areas.

The access router 130 may have knowledge of the connected base station sites 140, 142, 144, the corresponding carrier frequencies and available radio access technologies. Each radio access technology at a base station 140, 142, 144 is a cell. This means there might be several co-located cells belonging to different radio access technologies and possibly several cells within the same radio access technology, i.e. on different carriers, e.g. two WCDMA cells operating on two different frequencies.

During an initiation phase, the access pipe manager 110 builds up the access pipes that are applicable for a particular access router 130. This step takes into account the number of service classes the Operator wants to support and the capabilities of the available radio access technologies.

As an example, the Operator may support a broadband service class, a medium speed service class and a narrow band service class. The available radio access technologies at a certain site may comprise e.g. an LTE cell, a WCDMA cell and a GSM cell. An access pipe A, corresponding to the broadband service class, may be constructed such that the LTE cell is given the highest priority value within access pipe A, which may be referred to as A.1. The WCDMA cell may be given the second highest priority value within access pipe A, which may be referred to as A.2 etc, as illustrated in Table 1.

TABLE 1

| Base station | Radio Access Technology | Access Pipe and priority |
| --- | --- | --- |
| 140 | LTE | A.1; B.3; |
| 142 | WCDMA | A.2; B.1; C.2 |
| 144 | GSM | A.3; B.2; C.1 |

Once the access pipes are defined, the access pipe manager 110 may distribute them to the access router 130. The defined access pipes may be distributed to a plurality of access routers 130. Based on the access pipes, the access router 130 associate each base station site with one or more access pipes and associate each radio access technology a priority level within that access pipe. For instance, if two access pipes contain WCDMA, then e.g. the base station 140 providing the WCDMA access will be associated with those two access pipes, possibly at different priority levels.

Thus each of the base station 140, 142, 144 receive a respective reference to [Access Pipe, Priority Level] pairs from the access router 130. In the previous example, base station 140 receives references to two such pairs, since WCDMA is a member of two different access pipes, or service classes.

The base station sites are physical and/or geographical locations, where a number of cells belonging to different radio access technologies and/or to different carrier frequencies within the same radio access technology may be co-located, as previously discussed.

The most important interfaces of the multi-radio access technology and frequency system as described in FIG. 1 a are the interface between the operation and maintenance system 120 and the access pipe manager 110, the interface between the access pipe manager 110 and the access router 130, the interface between the access router 130 and the base stations 140, 142, 144 and the interface between the access router 130 and the user equipment 150. These four interfaces will now be described more in detail.

The Operation and Maintenance node 120 may maintain a database containing information related to the operation and maintenance of the multi-radio access technology system. The Operation and Maintenance database may comprise information of the radio access technologies and frequencies available at each access router 130 and the defined access pipes. The operation and maintenance system 120 may offer e.g. a graphical user interface towards a network operator that facilitates the reading and manipulating of the access pipes. Such manipulation may comprise e.g. defining a new access pipe or adding and/or removing a radio access technology to and/or from an existing access pipe, changing the order of radio access technologies within an existing access pipe, etc. The interface between the operation and maintenance system 120 and the access pipe manager 110 allows the operation and maintenance system node 120 to read information from the access pipe manager 110, where access pipes are defined and provide information to the access pipe manager 110 such as e.g. creating, changing or deleting new access pipes.

The interface between the access router 130 and the access pipe manager 110 allows the access pipe manager 110 to gather information about the supported radio access technologies and/or frequencies from each base station 140, 142, 144 that is connected to that particular access router 130. The access pipe manager 110 also may use this interface to read and write access pipe information from and/or to the access router 130. For instance, when a new access pipe is defined, the definition of the new access pipe may be communicated to the access router 130 via this interface. Access router 130, in turn may send information to the access pipe manager 110 about the changes in the availability of the radio access technologies frequencies per base station 140, 142, 144. Also, when a new base station 140, 142, 144 is connected to the access router 130, the access router 130 may send information about the new base station 140, 142, 144 to the access pipe manager 110 via this interface. Such information may comprise data concerning the radio access technology used by the new base station 140, 142, 144.

The interface between the base station 140, 142, 144 and the access router 130 allows the access router 130 to send access pipe information and other information to specific base stations 140, 142, 144. This information may be e.g. the definition of a new access pipe or a change in the specific list of an existing access pipe or references to a service class. Base stations 140, 142, 144 may use this interface to send information about the available radio access technologies and/or frequencies. Base stations 140, 142, 144 may also send statistics on the usage of the access pipes, parameters related to particular radio access technologies and/or frequencies or report failure conditions, etc.

The logical interface between Access Routers 130 and the user equipment 150 may be used to communicate various types of non radio access network specific information such as non-access stratum (NAS) information to user equipment 150. This may be a modification of an access pipe that is relevant for the user equipment 150, or the creation of a new access pipe. For instance, the access router 130 may send the explicit list of a particular access pipe to a specific user equipment 150 via this logical interface, according to some embodiments. Also, the user equipment 150 may use this interface to signal the change of an access router 130 that it is connected to, due to mobility.

The behaviour of the user equipment 150 comprises three main phases. Firstly, at least one reference to an element of an access pipe, later also referred to as a service class level, is obtained. Secondly, the access pipe elements such as cells and priorities are acquired and thirdly, the cell with the highest priority is selected.

These three main phases will now be explained more in detail, from the perspective of the user equipment 150.

Obtain Access Pipe Reference

In the first phase the user equipment 150 has to obtain a reference to an access pipe, or service class level. Thus the user equipment 150 firstly has to learn what access pipe it belongs to. In this stage only a reference, such as a tag or a pointer denoting a particular access pipe to which the user equipment 150 subscribes to is assigned to it and not the complete access pipe comprising all the radio access technology information.

In some embodiments, this information may be part of the subscription and may be stored on the Subscriber Identity Module card (SIM card). A SIM card is a removable Integrated Circuit Card used for user equipments 150 such as mobile cellular telephony devices, mobile computers and mobile phones. The SIM card may store any information associated with the subscriber such as e.g. the service-subscriber key, sometimes referred to as an International Mobile Subscriber Identity (IMSI), which may be used to identify a subscriber to the network. The SIM card also allows users to change user equipment 150 by simply removing the SIM card from one user equipment 150 and inserting it into another user equipment 150. Thus the service class in reality may be associated with the SIM card rather than with the user equipment 150.

According to some embodiments, the user equipment 150 may store a first reference to a first service class and also a second reference to a second service class, which may be used e.g. when the first service class is not available, which may be the case within some sites. According to some embodiments, the user equipment 150 may also comprise a prioritised list of references to service classes to be used in priority order if the service class is not available on the present site. As an example, a reference to service class A may be prestored on the SIM card, with a reference to service class B prestored as a back up service class, to be used in locations where service class A is unavailable.

Alternatively, the access router 130 may use NAS signalling to assign the access pipe to the user equipment 150 when the user equipment 150 attaches to that access router 130. Generally this may be assigned at the time of tracking area update, essentially access router change. A tracking area, where the user equipment 150 location is known to the core network 100, may comprise of several cells such as e.g. 30-50 cells. The tracking area update may be done by the user equipment 150 in idle mode when it moves to another tracking area or directed by the network or when required to do so for some other reason.

According to some embodiments, the user equipment 150 may receive a reference corresponding to a service class via access stratum (AS) signalling, e.g. when selecting a public land mobile network at power up.

In some cases it might be necessary to provide or update the access pipe pointer. This may be illustrated by three mutually exclusive deployment scenarios. Firstly, in a homogeneous tracking area with respect to access pipes, in which all access pipes may be offered in all base station sites 140, 142, 144 within a tracking area. Secondly, in an inhomogeneous tracking area with respect to access pipes, wherein not all access pipes are available in all base station sites 140, 142, 144 within a tracking area. Thirdly, in homogeneous tracking areas with non-identical access pipes, wherein all access pipes may be offered in all base station sites 140, 142, 144, within a tracking area but different tracking areas provide different access pipes.

These three scenarios will now be further explained in detail.

Figure 2:
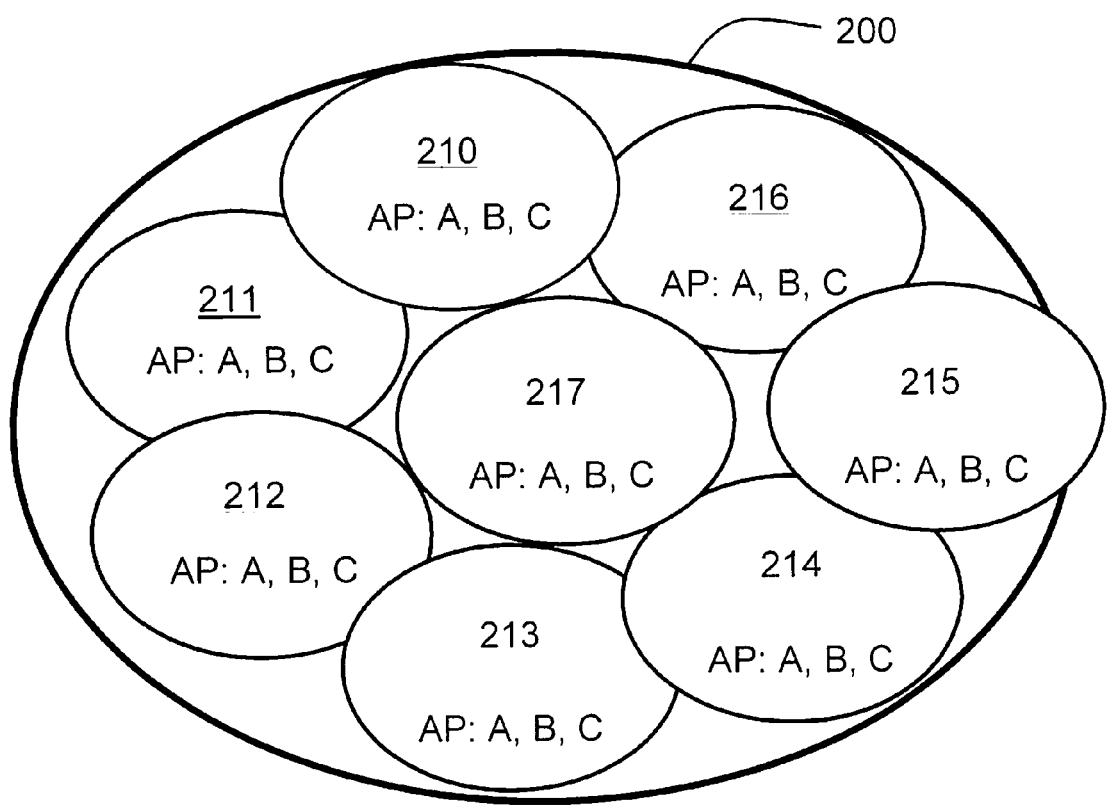
FIG. 2 is a schematic block diagram illustrating a homogeneous access pipe tracking area.

FIG. 2 illustrates a homogeneous tracking area 200 with respect to Access Pipes (AP) A, B, C. In FIG. 2, the shortening AP is used to denominate the available access pipes in each base station site 210, 211, 212, 213, 214, 215, 216, 217, due to diagrammatic limitations. All the base station sites 210, 211, 212, 213, 214, 215, 216, 217 comprised in the tracking area 200 offer all possible access pipes A, B, C, or subscription services as they also may be referred to, within that tracking area 200. This is because all base stations sites 210, 211, 212, 213, 214, 215, 216, 217 have ample capabilities in terms of radio access technologies, frequencies etc to support all three access pipes A, B, C. In the illustrated scenario, the user equipment 150 is able to camp on, and access services, at any site 210, 211, 212, 213, 214, 215, 216, 217 within the tracking area 200 in accordance with its subscription, i.e. obtained access pipe. In practice there may be multiple such homogeneous tracking areas 200 together providing a large homogeneous coverage area in terms of supported access pipes and access classes, such as e.g. a metropolitan area supporting the same access pipes A, B, C.

The access pipe manager 110 and also the core network 100 may via e.g. backhaul signalling or the operation and maintenance system 120 be aware of the status of the access pipes A, B, C in each of the base station sites 210, 211, 212, 213, 214, 215, 216, 217 within every tracking area 200. Therefore, in this scenario the access pipe assignment to the user equipment 150 via NAS signalling may simply be one pointer corresponding to the subscribed access pipe of the subscriber.

The user equipment 150 may be assigned to a service class via its subscription, stored e.g. on the user SIM card within the user equipment 150, as previously described. If the user equipment 150 does not receive any access pipe pointer via NAS signalling then it can assume that the subscription level access pipe is applicable in this tracking area. But the user equipment 150 can move between tracking areas that may or may not support its subscription level access pipes. Therefore this reference may be used to reconfirm the applicability of subscription access pipe in a particular tracking area.

Figure 3:
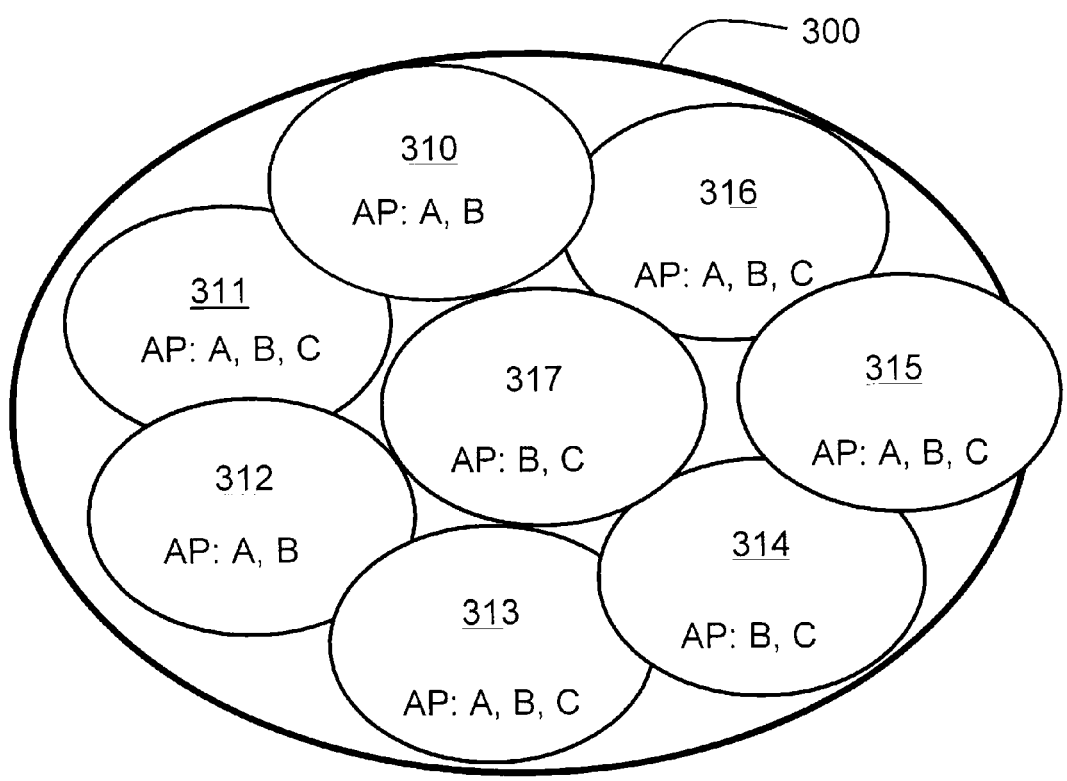
FIG. 3 is a schematic block diagram illustrating an inhomogeneous access pipe tracking area.

In FIG. 3 is an inhomogeneous access pipe tracking area 300 illustrated. In FIG. 3, the shortening AP is used to denominate the available access pipes in each base station site 310, 311, 312, 313, 314, 315, 316, 317, due to diagrammatic limitations. In this scenario, some of the base station sites 310, 311, 312, 313, 314, 315, 316, 317 within the tracking area 300 are unable to offer all possible access pipes A, B, C, or subscription services. This limitation may stem from the fact that some base stations 310, 312, 314, 317 do not have full capabilities due to capital expenditure savings, frequency license limitations or some planning/deployment constraints. For instance an operator of some base stations 310, 312, 314, 317 may deploy only smaller or fewer LTE bandwidths such as e.g. 1.25 MHz, whereas in other base stations such as in 311, 313, 315, 316 it may choose to have large bandwidths such as e.g. 10 MHz. Similarly, due to higher cost of equipment, e.g. multi carrier power amplifier, an operator may choose to deploy only one WCDMA carrier. This leads to a non uniform composition of sites 310, 311, 312, 313, 314, 315, 316, 317 in terms of available access pipe ingredients and thereby of aggregated bit rate that may be offered in the tracking area 300. This scenario is inevitable in some deployment areas and may be expected as a typical case during the early phase of LTE deployment. Consequently all possible access pipes A, B, C may not always be realizable across the entire tracking area 300.

As illustrated in the example in FIG. 3, sites 310 and 312 do not offer access pipe C, which may represent i.e. narrow band, where as sites 314 and 317 cannot offer access pipe A, which may represent i.e. broadband. This will lead to a situation in which, at least in exceptional cases, the user subscription level may need to be dynamically either upgraded or downgraded. For example, a user equipment 150 having obtained access pipe A, i.e. broadband, arriving to a site 317 where access pipe A is not available may be downgraded to access pipe B i.e. medium speed.

This type of agreement or understanding between the subscriber and the network operator may be made a priori. In case of any current deviation from the original subscription level, the latest subscription information may for instance be displayed on the screen of the user equipment 150.

In some alternative embodiments, the user equipment 150 sequentially searches through its associated access pipe for available radio access technologies and frequencies. In case none of the ingredients are available, the user equipment 150 may fall back to a behaviour without access pipes. That is, it may search for any available radio access technology and use mechanisms known to the person skilled in the art to detect and select from among the available radio access technologies.

In order to address the issues described above the NAS signalling may provide a mechanism that explicitly specifies the behaviour of the user equipment 150 in case it ends up camping on a site that cannot meet its subscription level access pipe requirements. Thus in inhomogeneous access pipe tracking area 300 at the time of tracking area update, the core network 100 via NAS signalling may inform each user equipment 150 about the access pipes to be used. This signalling may alternatively be made either by signalling explicit access pipe pointers or signalling relative access pipe pointers.

The first signalling method involving signalling to signal explicit access pipe pointers from the core network 100 to the user equipment 150, may be made by using NAS signalling. According to some embodiments, two sets of access pipe pointers may be signalled to the user equipment 150; a pointer to the default access pipe, e.g. A, according to the subscription of the user equipment 150 and a pointer to a reserve access pipe, e.g. B, to be used in case the default access pipe A is not available.

This procedure may if necessary be repeated, such that a list of access pipe pointers in a priority order may be signalled to the user equipment 150. However, in principle it may be sufficient with signalling the second reserve access pipe pointer B, provided the user equipment 150 has obtained its default access pipe A through information stored on the SIM card.

Alternatively, according to some embodiments, relative pointers may be used. According to those embodiments, the network via NA8 signalling provides only one relative tag or pointer. Thus it signals to a user equipment 150, either to upgrade or downgrade the access pipe pointer, or service level, for a user equipment 150 depending upon the obtained subscription level and available access pipes.

The process steps for upgrading the access pipe level are that the user equipment 150 firstly selects its default access pipe or service class, according to e.g. subscription on the SIM card. If the default access pipe is not found, then the next available higher priority access pipe or some default radio access technology may be selected.

The downgrade process may be performed in a similar way; the user equipment 150 selects its default access pipe, according to subscription on the SIM card. If the default access pipe is not found, then the user equipment selects the next available lower priority access pipe or some default radio access technology.

The firstly described method with explicitly indicated subsequent assigned access pipe is more flexible than the secondly described method with relative access pipe pointers, but it may require somewhat more radio interface signalling overhead.

In a third scenario (not shown), homogeneous tracking areas with non-identical access pipes are concerned. In this scenario, all sites within a tracking area provide the same access pipes but different tracking areas provide different access pipes. For example, two adjacent tracking areas may offer access pipes A, B, C and access pipes A, B, respectively. This means that a user equipment 150 with subscription to access pipe C, for instance, after moving to tracking area without access pipe C, is upgraded to access pipe B or A. Similarly it can be commanded to revert to its original service level C if it moves back to the other tracking area that provides access pipe C. The service upgrade or down grade may be handled by using the previously described principles, described in the context of an inhomogeneous tracking area scenario.

Acquisition of Access Pipe Elements: Cells and Priorities

During the searching phase, the user equipment 150 searches for messages comprising references to the access pipe entities or ingredients e.g. radio access technology, frequency, etc that announce themselves as members of the service class that the user equipment 150 is assigned to. These elements may be co-located cells belonging to different radio access technologies and/or within the same radio access technology but possibly operating on different carrier frequencies, as previously discussed.

Figure 4A:
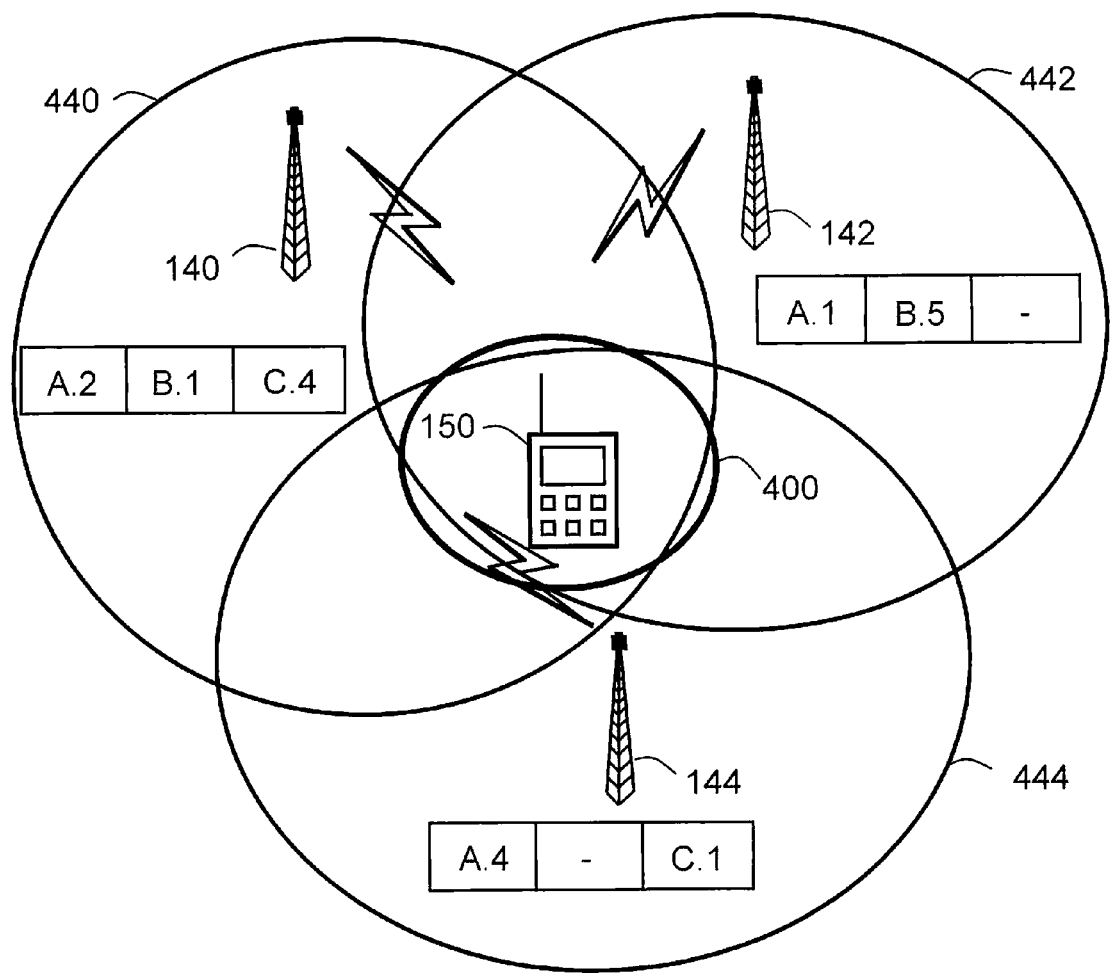
FIG. 4a is a block diagram depicting cells and broadcasted access pipe references according to some embodiments.

FIG. 4a depicts a scenario with three co-located cells 440, 442, 444, slightly overlapping each other, creating a site 400. However, the overlapping is made only for the sake of diagrammatic simplicity, in practice the three cells 440, 442, 444 may fully overlap.

In FIG. 4a, site 400 is shown as being serviceable from either cell 440, 442 or cell 444.

Within an access pipe, the constituent radio access technologies have different unique priority levels. The announcement related to access pipe details i.e. priority level etc may be done by each of these co-located cells e.g. on its own broadcast channel. The information may be sent in a plurality of ways, according to different embodiments.

According to some embodiments, the broadcast channel of each cell 440, 442, 444 only provides a reference to the service class and e.g. associated priority level, offered in that particular cell 440, 442, 444 as illustrated in FIG. 4*a*. The message sent from the cell 440, 442, 444 does not contain any reference to access pipes available in other co-located cells 440, 442, 444 in that site 400. This means that the user equipment 150 has to categorically read system information of all the co-located cells 440, 442, 444 in order to acquire full access pipes details in a particular location 400. This solution reduces signalling overheads on the broadcast channel but may lead to more processing on the user equipment 150 side. This arrangement is illustrated by an example assuming three access pipes A, B, C in FIG. 4*a*. For instance, Cell 440 contains elements of all three available access pipes A, B, C with different priority level. The priority level A.2 means Cell 440 has second highest priority in access pipe A. Similarly in this example, Cell 442 does not contain any ingredient of access pipe C. This implies that the user equipment 150 with access pipe C level subscription may not camp on cell 442, at least not without upgrading to service class B, in which case it may camp on e.g. B.5. Instead it may search for other cells 440, 442, 444. Eventually, the user equipment 150 may find the broadcast from cell 444, which send on a radio access technology and frequency which has priority level 1 in access pipe C. Thus the user equipment 150 may camp on cell 444 and inhibit further cell search, as a higher priority level within access pipe C may not be achieved. By inhibiting further cell search, battery resources of the user equipment 150 may be saved.

When the user equipment 150 is in idle mode, the access pipe related information may be sent in a message as described above, e.g. via a broadcast. But if the described method is performed when the user equipment 150 is operating in connected mode, then this information may be sent either via broadcast or directly to the user equipment 150 via e.g. the Downlink Shared Channel or any other user specific channel or combination thereof.

However, according to some embodiments, the broadcast channel of each access pipe entity provides access pipe information concerning the own cell 440, 442, 444 as described above, but also at least some level of access pipe details of other co-located cells 440, 442, 444. One comprehensive solution may be to send full access pipe details of all the co-located cells 440, 442, 444 within the same site 400. However, this would require increased signalling overheads.

Therefore one solution involving relatively lower overheads is that each cell 440, 442, 444 only sends some simple indication on its broadcast channel whether a particular co-located cell 440, 442, 444 offers a particular access pipe or not. This mechanism is illustrated in FIG. 4*b*. Firstly, Cell 440 according to some embodiments may broadcast complete details of access pipes it offers according to the previously described embodiment. In addition, Cell 440 also broadcasts information concerning whether the co-located cells offer a particular access pipe. This complementary information requires minimal overheads as it can be expressed in terms of single bit per access pipe per co-located cell, i.e. Yes/No. This solution will also avoid user equipment 150 from searching cells 440, 442, 444, which are of lower priority or do not belong to its assigned access pipe. Thus battery resources may be saved in the user equipment 150.

As previously described, when the user equipment 150 is in idle mode, access pipe related information may be sent via the broadcast channel. But if signalling is performed also when the user equipment 150 is in connected mode, then the information may be sent either via the broadcast channel or directly to the user equipment 150 via e.g. the Downlink Shared Channel or any other user specific channel or combination thereof.

Ensuring access pipe assignment during idle mode to connected mode transition and during handover in connected mode. When the user equipment 150 becomes active, i.e. in connected mode, due to resource limitation at the cell 440, 442, 444 on which the user equipment 150 is camped on, the network may have the possibility to move this user equipment 150 to another cell 440, 442, 444 without defying its access pipe subscription. This means that the network, if required, may move the user equipment 150 to a cell 440, 442, 444 of lower priority but belonging to the same access pipe A, B, C to which the user equipment 150 is subscribed to. In order for the base station 140, 142, 144 to fulfil this requirement it may be aware of user equipment 150 access pipe subscription level as well as the default reserve access pipe in case the primary subscription level access pipe is not available or possible. For instance the base station 140, 142, 144 may be informed by the core network 100 e.g. by an access gateway, which has full user equipment 150 subscription details.

Secondly it may know at least all the access pipes in the same site. In heterogeneous sites in terms of availability of access pipes, the base station site may also be aware of access pipes, or the difference, used in at least the closest neighbour sites. This is to ensure that in the connected mode the serving cell requests the user equipment 150 to measure only on the target frequency carriers and radio access technology that correspond to its access pipe subscription level, or service class, and which are also available in the neighbour sites. This means for access pipe information may also have to be exchanged between the base station sites over X2 interface, i.e. between base stations in LTE.

Camping on Best Possible Access Pipe Cell

The user equipment 150 uses the information acquired in the previously described steps, obtaining of access pipe reference and acquisition of access pipe elements, to eventually decide the cell 440, 442, 444 on which it should camp on. The aim is obviously to camp on the cell 440, 442, 444 with highest possible priority belonging to its service class. In other words, the user equipment 150 tries to camp on its highest priority ingredient within its associated service class. When camping on its highest priority ingredient, the user equipment 150 does not need to scan for alternative ingredients with lower priority which facilitates power saving.

The signalling in the first two stages provides ample information regarding the availability of access pipes and their corresponding cells/elements. Therefore in case the highest priority cell 440, 442, 444 is not available, the user equipment 150 attempts to camp on the cell 440, 442, 444 with the next higher priority and so on.

It may be noted that in order for the user equipment 150 to obtain a reference to a service class via NAS signalling, the first step being described in the section about acquisition of reference to a service class, the user equipment 150 may at least temporarily camp on a cell 440, 442, 444, e.g. in terms of best radio quality so as to establish the communication link between itself and the core network 100 that may provide a reference to a service class. Thus the hierarchical procedure requires that user equipment 150 eventually camps on to the cell 440, 442, 444 in accordance with the composite information acquired from the core network 100 and via broadcast channels.

Figure 5:
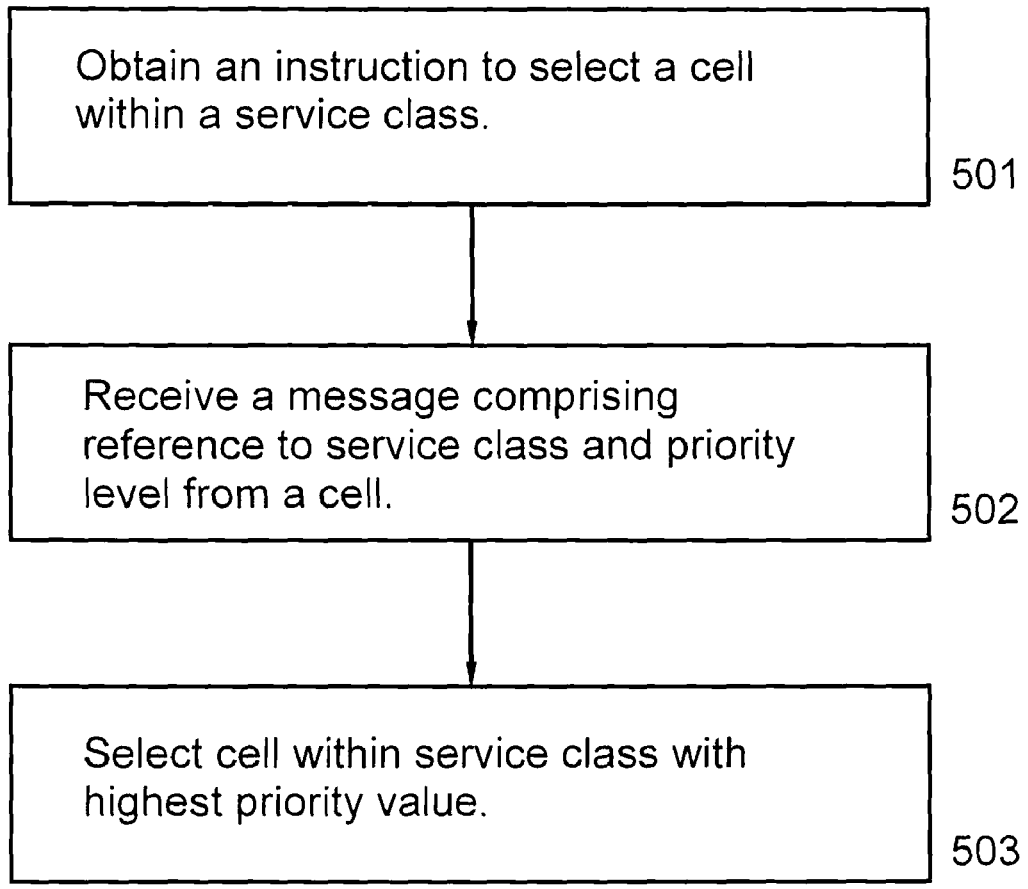
FIG. 5 is a flow chart illustrating a method in a user equipment according to some embodiments.

FIG. 5 is a schematic flow chart illustrating the method in the user equipment 150 for selecting a cell 440, 442, 444 associated with a radio access technology according to some general embodiments.

To appropriately select a cell 440, 442, 444 associated with a radio access technology, the method may comprise a number of steps 501-503. It is however to be noted that some of the described method steps are optional and only comprised within some embodiments. Further, it is to be noted that the method steps 501-503 may be performed in another chronological order than the enumeration indicates and that some of them, e.g. step 502 and step 503, or even all steps may be performed simultaneously or in an altered, arbitrarily rearranged, decomposed or even completely reversed chronological order. The method may comprise the following steps:

Step 501

An instruction to select a cell 440, 442, 444, to be used by the user equipment 150, among cells 440, 442, 444 using a radio access technology being associated with a specific service class is obtained.

According to some embodiments, this step may be performed by retrieving a prestored instruction to select a cell 440, 442, 444 to be used among cells 440, 442, 444 using a radio access technology being associated with the specific service class. The instruction may be prestored on a SIM card 550 of the user equipment 150.

The instruction may comprise a reference to a service class and further instructions to only listen to base stations 140, 142, 144 that send out a message with a reference to the same service class. Further, the instruction may comprise the further instructions of selecting the cell 440, 442, 444 belonging to the same service class to camp on, which cell 440, 442, 444 has the highest priority level value. Also the instruction may comprise further instructions to stop listening to further messages once the cell 440, 442, 444 with the highest priority level has been detected.

According to some embodiments, the step of obtaining an instruction may be performed by receiving the instruction from the cell 440, 442, 444 of replacing, at least temporarily, the prestored instruction.

This step may also be performed by receiving an instruction of replacing, at least temporarily, the prestored instruction by means of non access stratum (NAS) signalling from a core network node 110.

Step 502

A message is received from at least one cell 440, 442, 444. The cell 440, 442, 444 uses a certain radio access technology. The received message comprises a reference to a service class and a priority level, associated with the radio access technology used within the cell 440, 442, 444.

The message from the cell 440, 442, 444 thus comprises one reference to a service class and a priority level. The service class and priority levels may be associated with the radio access technology used by the cell 440, 442, 444.

According to some embodiments, the message from the cell 440, 442, 444 further may comprise a reference to a service class and a priority level. The service class and priority levels may be associated with the radio access technology used by another cell 440, 442, 444. For example, the base station 140, 142, 144 may signal information concerning whether a certain service class is available at the neighbouring base stations 140, 142, 144. The message may according to some embodiments be broadcasted by the base station 140, 142, 144 within the respective cell 440, 442, 444.

Step 503

A cell 440, 442, 444 is selected, among the at least one cells 440, 442, 444. The selected cell 440, 442, 444 is using a radio access technology being associated with the specific service class in accordance with the obtained instruction. The selected cell 440, 442, 444 is also associated with the highest priority level within that service class.

Figure 6:
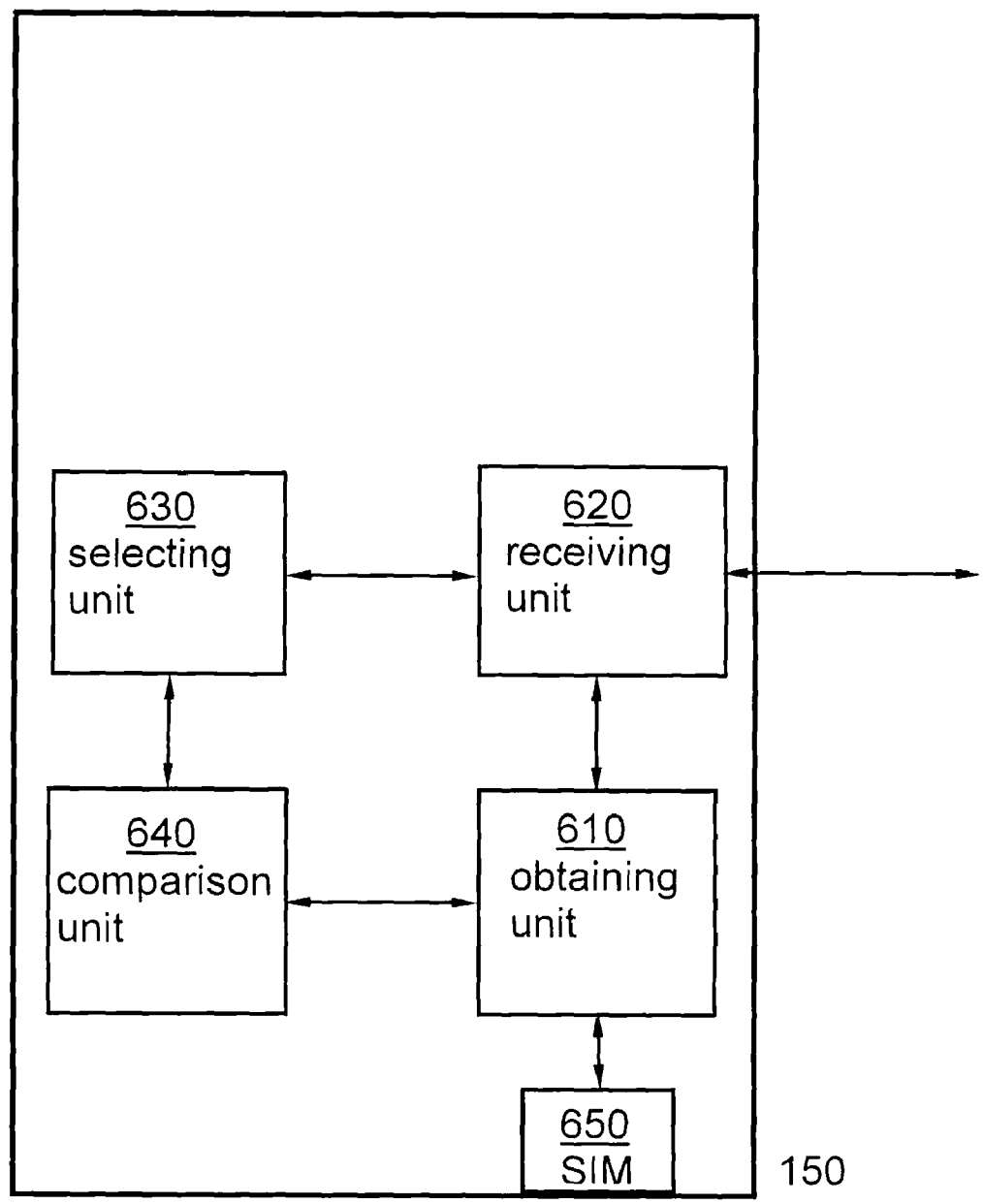
FIG. 6 is a block diagram illustrating an arrangement in a user equipment according to some embodiments.

FIG. 6 is a schematic block diagram illustrating an arrangement in a user equipment 150. The arrangement is adapted to perform the above described method steps 501-503, for selecting a cell 440, 442, 444 associated with a radio access technology. The arrangement comprises an obtaining unit 610. The obtaining unit 610 is adapted to obtain an instruction to select a cell 440, 442, 444 to be used among cells 440, 442, 444 using a radio access technology being associated with a specific service class. The service class may be e.g. broad band, narrow band etc.

Also, the arrangement comprises a receiving unit 620. The receiving unit 620 is adapted to receive a broadcast from at least one cell 440, 442, 444. The broadcast uses a radio access technology being associated with a service class and being associated with a priority level.

Further, the arrangement comprises a selecting unit 630. The selecting unit 630 is adapted to select a cell 440, 442, 444. The cell 440, 442, 444 is selected among the at least one cells 440, 442, 444, which cell 440, 442, 444 is using a radio access technology being associated with the specific service class in accordance with the obtained instruction. And, which cell 440, 442, 444 is associated with the highest priority level within the specific service class.

The arrangement may optionally comprise, according to some embodiments, a comparison unit 640, adapted to compare the priority levels of received messages from different cells 440, 442, 444.

The arrangement may optionally comprise, according to some embodiments, a SIM card 650, adapted to store information concerning the subscription, e.g. the service class. According to some embodiments, an instruction to select a cell 440, 442, 444 to be used among cells 440, 442, 444 using a radio access technology being associated with a specific service class may be stored on the SIM card.

For the sake of clarity and in order not to render unnecessary aggravating circumstances for the uninitiated reader to comprehend the present user equipment 150, any internal electronics of the user equipment 150, not completely necessary for performing the present method according to steps 501-503 has been omitted from FIG. 6.

It is to be noted that the described units 610-650 comprised within the user equipment 150 are to be regarded as separate logical entities but not with necessity separate physical entities. Any, some or all of the units 610-650 may be comprised or co-arranged within the same physical unit. However, in order to facilitate the understanding of the functionality of the arrangement in a user equipment 150, the comprised units 610-650 are illustrated as separate physical units in FIG. 6.

Figure 7:
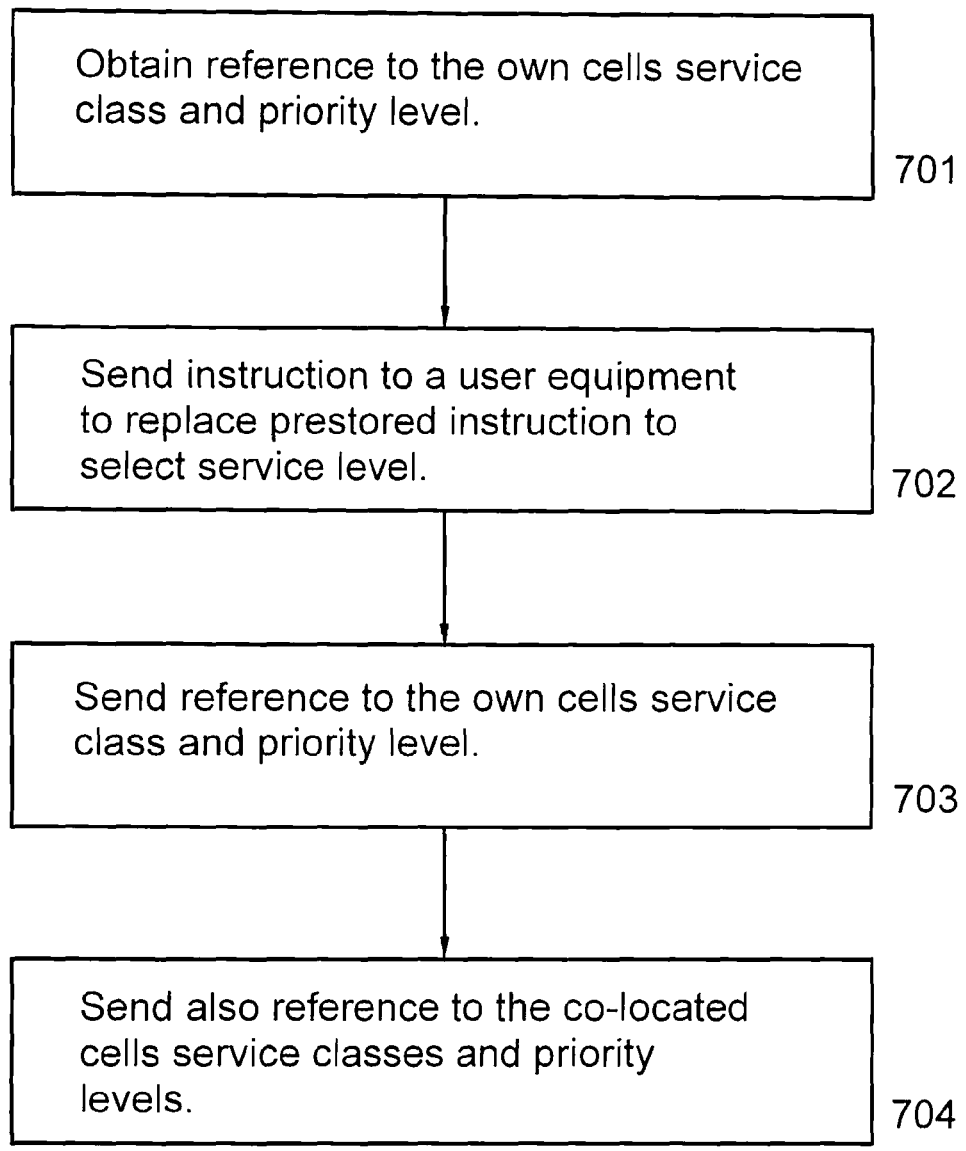
FIG. 7 is a flow chart illustrating a method in a base station according to some embodiments.

FIG. 7 is a flow chart illustrating a method in a base station 140, 142, 144 serving a cell 440, 442, 444, for assisting a user equipment 150 to select a cell 440, 442, 444 associated with a radio access technology. The base station 140, 142, 144 is using a radio access technology comprised within a service class at a certain priority level.

To appropriately assist a user equipment 150 to select a cell 440, 442, 444 associated with a radio access technology, the method may comprise a number of steps 701-704. It is however to be noted that some of the described method steps are optional and only comprised within some embodiments. Further, it is to be noted that the method steps 701-704 may be performed in any arbitrary chronological order and that some of them, e.g. step 702 and step 703, or even all steps may be performed simultaneously or in an altered, arbitrarily rearranged, decomposed or even completely reversed chronological order. The method may comprise the following steps:

Step 701

An association between the radio access technology used within the cell 440, 442, 444 and a service class at a certain priority level is obtained.

The radio access technology used within the cell 440, 442, 444 may have been associated with a plurality of service classes, possibly at different priority level. Thus the radio access technology used by the base station 140, 142, 144 may, mentioned merely as an illustrating example, be associated with service class A at priority level 2, while also being associated with service class B at priority level 4 and service class C at priority level 7.

According to some optional embodiments, the association between the radio access technology used within the cell 440, 442, 444 and the service class at a certain priority level may be obtained from a core network node 110.

Step 702

An instruction is sent to the user equipment 150 for replacing, at least temporarily, a prestored instruction to select a cell 440, 442, 444 to be used among cells 440, 442, 444 using a radio access technology being associated with a specific service class.

According to some optional embodiments, the sending may be performed via a broadcast channel. The broadcast channel may be the Broadcast Control Channel (BCCH), which may send information including also e.g. the identity of the base station 140, 142, 144, the frequency allocations of the base station 140, 142, 144, and the frequency-hopping sequences it uses as well as a list of neighbouring cells that the mobile might like to consider, and their service class level. Alternatively, according to some embodiments, the Frequency Correction Channel (FCCH) and/or Synchronisation Channel (SCH) may be used.

According to some optional embodiments, the sending may be performed via a downlink shared channel or any user specific channel. An example may be The Random Access Channel (RACH) may be used by the user equipment 150 e.g. to request a connection, for example to get the attention of the base station 140, 142, 144 in order to initially synchronize its transmission with the base station 140, 142, 144. Alternatively, the Paging Channel (PCH), which alerts the user equipment 150 of an incoming call, may be used, or the Access Grant Channel (AGCH). Another option according to some embodiments may be to use the Random Access Channel.

Step 703

One reference to the service class and the priority level associated with the radio access technology used by the cell 440, 442, 444 is sent. The reference may be sent to the user equipment 150, e.g. by means of broadcasting.

Step 704

This step is optional and is only performed within some embodiments. According to some optional, the step of sending may be performed by also sending a reference to the service class and the priority level associated with the radio access technology used by at least one other cell 440, 442, 444. The other cell 440, 442, 444, or plurality of cells 440, 442, 444 may be co-located within the same base station site 400. Thus information indicating whether a particular service class is supported or not in neighbouring cells 440, 442, 444 may be signalled to the user equipment 150, from a base station 140, 142, 144 within one cell 440, 442, 444.

Figure 8:
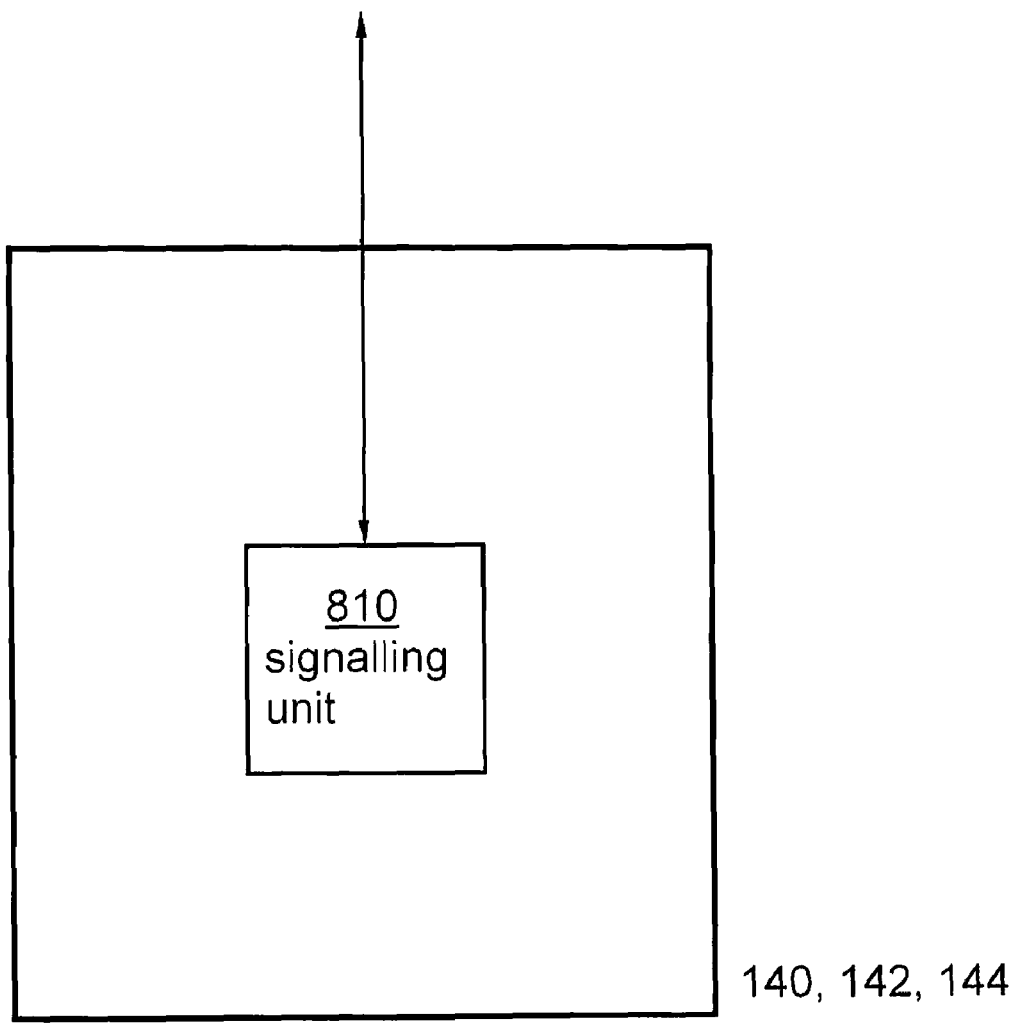
FIG. 8 is a block diagram illustrating an arrangement in a base station according to some embodiments.

FIG. 8 illustrates schematically an arrangement in a base station 140, 142, 144. The arrangement is adapted to perform the above described method steps 701-704. The base station 140, 142, 144 is serving a cell 440, 442, 444. The base station 140, 142, 144 assist a user equipment 150 to select a cell 440, 442, 444 associated with a radio access technology. The base station 140, 142, 144 is adapted to offer a radio access technology comprised within a service class at a certain priority level. The arrangement comprises a signalling unit 810, adapted to send a reference to the service class and the priority level associated with the radio access technology used by the base station 140, 142, 144. The signalling unit 810 may be embodied e.g. by means of a transceiver. The transceiver may comprise a transmitter circuit and a receiver circuit, which respectively transmits outgoing radio frequency signals via an antenna. The antenna may be an embedded antenna, a retractable antenna or any antenna known to those having skill in the art without departing from the scope of the present invention.

Figure 9:
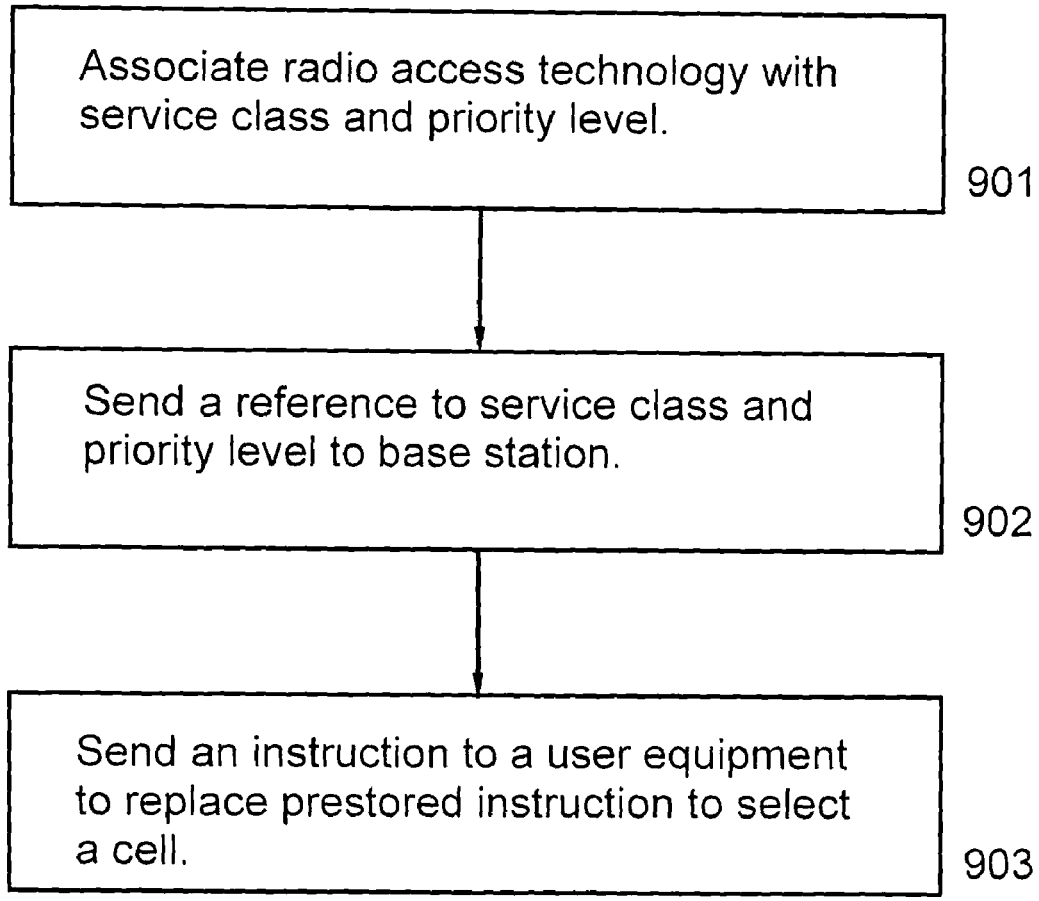
FIG. 9 is a flow chart illustrating a method in a core network node according to some embodiments.

FIG. 9 is a flow chart illustrating a method in a core network node 110 for configuring service classes in a network.

To appropriately configure service classes in a network, the method may comprise a number of steps 901-903. It is however to be noted that some of the described method steps are optional and only comprised within some embodiments. Further, it is to be noted that the method steps 901-903 may be performed in any arbitrary chronological order and that some of them, e.g. step 902 and step 903, or even all steps may be performed simultaneously or in an altered, arbitrarily rearranged, decomposed or even completely reversed chronological order. The method may comprise the following steps:

Step 901

A radio access technology is associated with a specific service class and a specific priority level. Thus each available radio access technology within the network 100 may be associated with a specific service class and given a specific priority level within the class. These made associations may then be compiled in an access pipe and stored e.g. in a memory unit accessible from the core network node 110.

Each available radio access technology may be associated with a plurality of service classes, possibly at different priority level. Thus the radio access technology used e.g. by the base station 140, 142, 144 may, mentioned here merely as an illustrating example, be associated with service class A at priority level 2, while also being associated with service class B at priority level 4 and service class C at priority level 7.

Step 902

A reference to the service class and the priority level associated with the radio access technology used by the base station 140, 142, 144, may be sent to the base station 140, 142, 144.

According to some optional embodiments, also information concerning co-located cells 440, 442, 444 may be signalled to the base station 140, 142, 144. Thus the base station 140, 142, 144 according to these embodiments, in turn may signal information to the user equipment 150 concerning whether a particular service class is supported or not in any of the co-located cells 440, 442, 444.

Step 903

This step is optional and may only be performed within some embodiments. An instruction may be sent to a user equipment 150, to replace, at least temporarily, a prestored instruction to select a cell 440, 442, 444 to be used among cells 440, 442, 444 using a radio access technology being associated with a specific service class. The signal may be sent by means of non access stratum (NAS) signalling.

Figure 10:
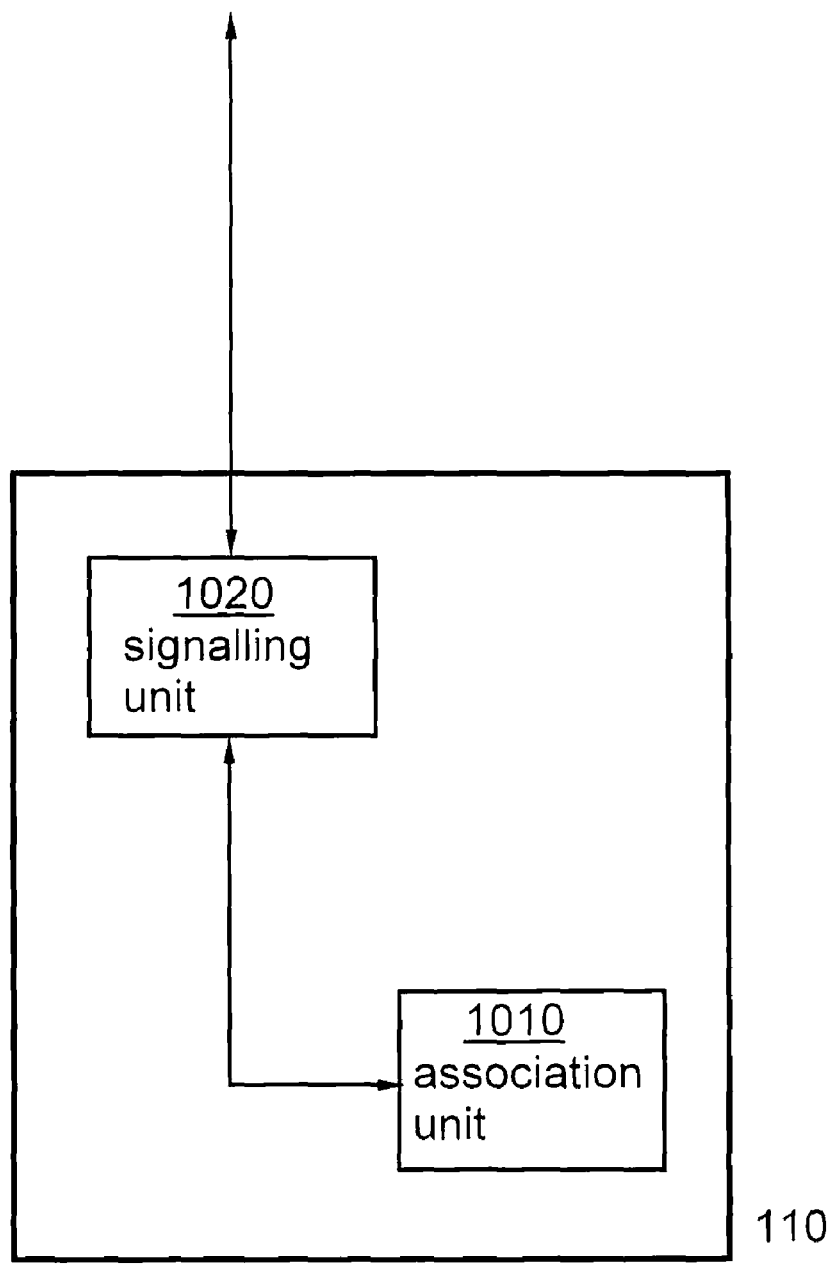
FIG. 10 is a block diagram illustrating an arrangement in a core network node according to some embodiments.

FIG. 10 is illustrating an arrangement in a core network node 110 for configuring service classes in a network. The arrangement comprises an association unit 1010. The association unit 1010 is adapted to associate a radio access technology with a specific service class and a specific priority level.

Also, the arrangement comprises a signalling unit 1020, adapted to send, to a base station 140, 142, 144, a reference to the service class and the priority level associated with the radio access technology used by the base station 140, 142, 144.

According to some optional embodiments, the arrangement in a core network node 110 may further comprise signalling means adapted to non access stratum (NAS) signalling.

The methods in a user equipment 150 for selecting a cell 440, 442, 444 and the methods in a base station 140, 142, 144 for assisting a user equipment 150 to select a cell 440, 442, 444 and also the method in a core network node 110 for configuring service classes in a network according to the present methods may be implemented through one or more processors, together with computer program code for performing the functions of the methods. The program code mentioned above may also be provided as a computer program product, for instance in the form of a data carrier carrying computer program code for performing the method according to the present invention when being loaded into the base station 140, 142, 144 and/or the user equipment 150. The data carrier may be a CD ROM disc, a memory stick, or any other medium such as a disk or tape that can hold machine readable data. The computer program code can furthermore be provided as pure program code on a server and downloaded to the base station 140, 142, 144 and/or user equipment 150 remotely.

Thus a computer readable medium encoded with a computer program for selecting a cell 440, 442, 444 associated with a radio access technology may perform the method steps according to steps 501-503.

Thus also a computer readable medium encoded with a computer program for serving a cell 440, 442, 444, for assisting a user equipment 150 to select a cell 440, 442, 444 associated with a radio access technology may perform the method steps according to steps 701-704.

Thus also a computer readable medium encoded with a computer program for configuring service classes in a network may perform the method steps according to steps 901-903.

As will be appreciated by one of skill in the art, the present invention may be embodied as a method in a user equipment 150, an arrangement in a user equipment 150, a method in a base station 140, 142, 144, an arrangement in a base station 140, 142, 144, a method in a core network node 110 and an arrangement in a core network node 110 or computer program products.

Accordingly, the present invention may take the form of an entirely hardware embodiment, a software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present methods may be written in any arbitrary programming language such as Java®, Smalltalk or C++. However, the computer program code for carrying out the steps of the present method may also be written in any conventional procedural programming languages, such as the "C" programming language and/or a lower level assembler language. The program code may execute entirely on the user equipment 150, partly on the user equipment 150, as a stand-alone software package, partly on the user equipment 150 and partly on a remote computing device or entirely on the remote computing device. In the latter scenario, the remote computing device may be connected to the user equipment 150 through a local area network (LAN) or a wide area network (WAN), or the connection may be made to an external computer, for example, through the Internet using an Internet Service Provider.

Furthermore, the present methods were described in part above with reference to flowchart illustrations and/or block diagrams of a user equipment 150, a base station 140, 142, 144, methods, and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Alternative Embodiments

According to some embodiments is a method in a first network node 110, for configuring and updating a user equipment 150 with detailed information provided. The detailed information may be related to its service class, where the offering of services to the user equipment 150 is mapped, via its subscription, to multiple service classes which are further associated with different levels of priority, out of which at least one service class is assigned to each user equipment 150 where the priority of each service class is defined by terms of the combination of one or more co-located cells 440, 442, 444. The one or more co-located cells 440, 442, 444 may operate on different carrier frequencies and/or radio access technologies, via a signalling mechanism. The method comprising the step of signalling, via a second network node 130, to the user equipment 150 a first set of information comprising of a pre-assigned primary service class. Also, the method comprising the step of signalling, via third network node 140, to the user equipment 150 a second set of information comprising of details of all service levels offered by the third node.

Further, according to some optional embodiments, the method for configuring and updating a user equipment 150 further comprises the step of creating, in an access pipe manager 110 via input from an operational-, and a maintenance node 120, configuration information comprising of multiple service classes.

Further, according to some optional embodiments, the method for configuring and updating a user equipment 150 further comprises the step of signalling the configuration information from the access pipe manager in the first network node 110 to the second 130 and the third 140 network nodes.

Further, according to some optional embodiments, the method for configuring and updating a user equipment 150 further comprises the step of sending the first set of information, during the tracking area update carried out by the user equipment 150, via non access stratum (NAS) signalling.

Further, according to some optional embodiments, the method for configuring and updating a user equipment 150 further comprises the step of indicating both primary and secondary service classes, in case a at least one base station site within a tracking area 200, 300 does not offer the primary service class.

Further, according to some optional embodiments, the method for configuring and updating a user equipment 150 further comprises the step of indicating both primary and secondary service classes, in case a at least one base station site between different tracking areas 200, 300 does not offer the primary service class.

Further, according to some optional embodiments of the method for configuring and updating a user equipment 150, the secondary service class could be of higher or lower priority compared to the primary service class.

Further, according to some optional embodiments of the method for configuring and updating a user equipment 150, the primary and secondary service classes are indicated by two separate values.

Further, according to some optional embodiments of the method for configuring and updating a user equipment 150, the primary and secondary service classes are indicated by single parameter sent at a time and the said parameter can either have a meaning such as upgrade, which means said user equipment 150 can access the next higher priority service if the said primary service class is inaccessible or it can have a meaning such as downgrade, which means said user equipment 150 can access the next lower priority service if the said primary service class is inaccessible.

Further, according to some optional embodiments of the method for configuring and updating a user equipment 150, the second network node 130 resides in the core network 100 such as access gateway.

Further, according to some optional embodiments of the method for configuring and updating a user equipment 150, the third network node 140 is a base station site or any similar node that resides in the radio access network.

Further, according to some optional embodiments of the method for configuring and updating a user equipment 150, the third network node 140 sends the second set of information to the user equipment 150 via a broadcast channel.

Further, according to some optional embodiments of the method for configuring and updating a user equipment 150, the third network node 140 sends the second set of information to the user equipment 150 via downlink shared channel or any user specific channel.

Further, according to some optional embodiments of the method for configuring and updating a user equipment 150, the third network node 140 sends the second set of information to the user equipment 150 via a combination of broadcast channel or downlink shared channel or any user specific channel.

Further, according to some optional embodiments of the method for configuring and updating a user equipment 150, the said second set of information comprises of the priority level of the service classes offered in the cell 440, 442, 444, which sends the second set information.

Further, according to some optional embodiments of the method for configuring and updating a user equipment 150, the said second set of information corresponds to the cell 440, 442, 444, which sends the second set of information as well as the corresponds to other co-located cells 440, 442, 444 within the same base station site.

Further, according to some optional embodiments of the method for configuring and updating a user equipment 150, the said second set of information corresponding to other co-located cells 440, 442, 444 indicates whether a particular service class is supported or not in the co-located cells 440, 442, 444.

Further, according to some optional embodiments of the method for configuring and updating a user equipment 150, the user equipment 150 is in idle mode.

Further, according to some optional embodiments of the method for configuring and updating a user equipment 150, the user equipment 150 is in connected mode.

While the methods and arrangements described in this document are susceptible to various modifications and alternative forms, specific embodiments thereof are shown by way of example in the drawings and are herein described in detail. It should be understood, however, that there is no intent to limit the present methods and arrangements to the particular forms disclosed, but on the contrary, the present methods and arrangements are to cover all modifications, equivalents, and alternatives falling within the spirit and scope of the methods and arrangements as defined by the claims.

Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present.

Furthermore, "connected" or "coupled" as used herein may include wirelessly connected or coupled. As used herein, the term "and/or" includes any and all combinations of one or more of the associated listed items.

Unless otherwise defined, all terms including technical and scientific terms used herein have the same meaning as commonly understood by one of ordinary skill in the art to which these methods and arrangements belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

For purposes of illustration, embodiments of the present methods and arrangements are described herein in the context of a user equipment 150 and a base station 140, 142, 144. It will be understood, however, that the present methods and arrangements are not limited to such embodiments and may be embodied generally as any electronic device that includes radio signal propagation means thereon.

The invention claimed is:

1. A method in a user equipment for selecting a cell associated with a radio access technology, the method comprising:
   obtaining an instruction to select, from among multiple cells, a cell that is using a radio access technology associated with a specific service class;
   receiving, from each of one or more cells using a respective radio access technology, a message including a reference to a service class and a priority level within the service class associated with that respective radio access technology; and
   selecting, from among said one or more cells, a cell using a radio access technology that is associated with the specific service class in accordance with the obtained instruction and that is associated with the highest priority level within that specific service class.

2. The method of claim 1, wherein the message received from at least one of said one or more cells further comprises a reference to a service class and a priority level within the service class a radio access technology used by another cell.

3. The method of claim 1, wherein obtaining an instruction comprises retrieving a prestored instruction that is prestored on a SIM card of the user equipment.

4. The method of claim 3, wherein obtaining an instruction further comprises receiving an instruction to replace the prestored instruction with the received instruction, at least temporarily.

5. The method of claim 3, wherein obtaining an instruction comprises receiving an instruction to replace, at least temporarily, the prestored instruction according to non access stratum (NAS) signaling from a core network node.

6. An arrangement in a user equipment for selecting a cell associated with a radio access technology, the arrangement comprising:
   an obtaining unit adapted to obtain an instruction to select, from among multiple cells, a cell that is using a radio access technology associated with a specific service class;
   a receiving unit adapted to receive, from each of one or more cells using a respective radio access technology, a message including a reference to a service class and a priority level within the service class associated with that respective radio access technology; and
   a selecting unit adapted to select, from among said one or more cells, a cell using a radio access technology that is associated with the specific service class in accordance with the obtained instruction and that is associated with the highest priority level within that specific service class.

7. The arrangement of claim 6, wherein the arrangement further comprises:
   a comparison unit adapted to compare the priority levels of received messages from different cells.

* * * * *

UNITED STATES PATENT AND TRADEMARK OFFICE
CERTIFICATE OF CORRECTION

PATENT NO. : 8,346,257 B2  
APPLICATION NO. : 12/679407  
DATED : January 1, 2013  
INVENTOR(S) : Kazmi et al.

Page 1 of 1

It is certified that error appears in the above-identified patent and that said Letters Patent is hereby corrected as shown below:

On the Title Page, in Item (75), under "Inventors", in Column 1, Line 2, delete "Hasselby" and insert -- Hässelby --, therefor.

In the Specifications:

In Column 2, Line 9, delete "instance." and insert -- instance, --, therefor.

In Column 2, Line 42, delete "class." and insert -- class, --, therefor.

In Column 4, Line 43, delete "station." and insert -- station, --, therefor.

In Column 4, Line 52, delete "station." and insert -- station, --, therefor.

In Column 6, Line 38, delete "1 a" and insert -- 1a --, therefor.

In Column 8, Line 10, delete "1 a" and insert -- 1a --, therefor.

In Column 12, Line 6, delete "NA8" and insert -- NAS --, therefor.

In Column 20, Line 59, delete "130." and insert -- 130, --, therefor.

Signed and Sealed this  
Eleventh Day of June, 2013

Teresa Stanek Rea  
*Acting Director of the United States Patent and Trademark Office*